(12) United States Patent
Barasa

(10) Patent No.: US 8,527,185 B2
(45) Date of Patent: Sep. 3, 2013

(54) ENERGY-BASED CLOSED-LOOP CONTROL OF TURBINE OUTLET TEMPERATURE IN A VEHICLE

(75) Inventor: Patrick Barasa, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 493 days.

(21) Appl. No.: 12/938,413

(22) Filed: Nov. 3, 2010

(65) Prior Publication Data

US 2012/0109488 A1 May 3, 2012

(51) Int. Cl.
*B60T 7/12* (2006.01)
(52) U.S. Cl.
USPC .............................. 701/108; 123/437; 60/286
(58) Field of Classification Search
USPC ......... 701/101, 110, 112, 108, 114; 123/399, 123/434, 437; 60/286, 288, 289, 297, 605.1
See application file for complete search history.

(56) References Cited

U.S. PATENT DOCUMENTS

| | | | | |
|---|---|---|---|---|
| 4,532,982 A | * | 8/1985 | Nakamura | 60/39.461 |
| 7,281,531 B1 | * | 10/2007 | Fulton et al. | 123/568.17 |
| 7,353,106 B2 | * | 4/2008 | Kolmanovsky et al. | 701/112 |
| 7,383,119 B2 | * | 6/2008 | Lewis | 701/112 |
| 2010/0100300 A1 | * | 4/2010 | Brooks et al. | 701/102 |
| 2010/0327592 A1 | * | 12/2010 | Boot | 290/52 |

* cited by examiner

*Primary Examiner* — John Kwon
(74) *Attorney, Agent, or Firm* — Quinn Law Group, PLLC

(57) ABSTRACT

A vehicle includes an engine and an exhaust system which ignites fuel from fuel injectors to purify exhaust gas. An air compressor delivers compressed intake air to the engine, and a turbine energizes the compressor. A controller calculates an engine thermal efficiency value using temperature and mass flow rate values from various sensors. The controller maintains a temperature of the exhaust gas downstream of the turbine using the thermal efficiency value. A control system includes the sensors and a host machine operable for maintaining the temperature of the exhaust gas above the threshold using the thermal efficiency value. A method for maintaining the temperature of the exhaust gas includes measuring the inlet and outlet temperatures of an air intake system, measuring the mass flow rate of compressed intake air, and using the host machine to maintain the temperature of the gas using the thermal efficiency value.

16 Claims, 1 Drawing Sheet

ENERGY-BASED CLOSED-LOOP CONTROL OF TURBINE OUTLET TEMPERATURE IN A VEHICLE

TECHNICAL FIELD

The present invention relates to the control of a turbine outlet temperature in a vehicle which uses a turbine to drive an air compressor within an air intake assembly.

BACKGROUND

Particulate filters are used in vehicle exhaust systems to efficiently capture microscopic particles of soot, ash, metal, and other suspended matter which is generated during the fuel combustion process. However, over time the accumulated particulate matter increases the differential pressure across the filter. In order to extend the useful operating life of the filter and to further optimize engine performance, some particulate filters can be selectively regenerated using heat. Exhaust gas temperature is temporarily elevated by injecting and igniting fuel upstream of the filter above a calibrated light-off temperature. This process is often referred to as post-hydrocarbon injection or HCI.

In addition to the particulate filter, various catalysts may be used during the HCI process to further cleanse the exhaust gas. For example, palladium, platinum, or another suitable catalyst can work in conjunction with the regenerative heat to break down accumulated matter in the filter via a simple exothermic oxidation process. Additionally, the vehicle may use an exhaust gas recirculation (EGR) valve to direct a portion of the exhaust gas back into the engine's cylinders to further reduce vehicle emissions.

Within a turbocharged air intake compressor system, a variable geometry turbocharger, turbine, or other suitable device is driven by the exhaust gas that is discharged by the engine. The turbine rotates to drive an air compressor, which feeds the compressed intake air into the engine to boost engine power. Overall vehicle emissions performance is thus largely dependent on the temperature and mass flow of the exhaust gas and intake air at various stages of the combustion and exhaust cleaning processes.

SUMMARY

A vehicle is disclosed herein that includes a controller which automatically maintains a predetermined temperature at an outlet of the turbine noted above, to thereby control vehicle emissions and particulate filter regeneration. The controller operates in a closed loop using values which are measured with respect to the turbine and a turbine-driven compressor of an air intake assembly. These values are used by the controller to calculate an engine thermal efficiency value, and to adjust the air mass entering the engine and/or the fueling rate at which fuel is injected into the exhaust stream. In this manner, the controller maintains a desired turbine outlet temperature.

In particular, a vehicle includes an internal combustion engine, an exhaust system, a turbine, a turbine-driven air compressor, sensors, and a controller. The air compressor is operable for compressing intake air, and for delivering the compressed intake air to the engine. The turbine converts the exhaust gas from the engine into mechanical energy sufficient for powering the air compressor.

The sensors include a first sensor for measuring a temperature of the intake air entering the air compressor, a second sensor for measuring a temperature of the exhaust gas exiting the turbine, and a third sensor which measures a mass flow rate of the compressed intake air entering the engine. The controller calculates an engine thermal efficiency value as a function of the temperature and mass flow rate values from the various sensors. The controller uses the engine thermal efficiency value to execute a control action and thereby maintain a temperature of the stream of exhaust gas downstream of the turbine above a calibrated threshold temperature.

The controller uses the engine thermal efficiency value to calculate a required adjustment parameter, i.e., a change in a rate of injection of non-torque forming fuel into the injector and/or a change in the mass flow rate of compressed intake air entering the engine.

A control system is also disclosed herein for use aboard the vehicle described above. The control system includes the first temperature sensor, the second temperature sensor, and the mass flow sensor. A host machine calculates an engine thermal efficiency value as a function of the inlet temperature, the outlet temperature, and the mass flow rate of the compressed intake air. Thereafter, the host machine uses the engine thermal efficiency value maintains a temperature of the exhaust gas at the outlet of the turbine above a calibrated threshold temperature.

A method for maintaining a temperature of the exhaust gas in the vehicle noted above includes measuring the inlet and outlet temperatures of the air compressor and the turbine, respectively, and measuring a mass flow rate of the compressed intake air entering the engine from the compressor. The method additionally includes using a host machine to calculate an engine thermal efficiency value as a function of the inlet temperature, the outlet temperature, and the mass flow rate. The host machine then uses the engine thermal efficiency value to automatically maintain a temperature of the exhaust gas at the outlet of the turbine above a calibrated threshold temperature.

The above features and advantages and other features and advantages of the present invention are readily apparent from the following detailed description of the best modes for carrying out the invention when taken in connection with the accompanying drawings.

DESCRIPTION

Figure 1:
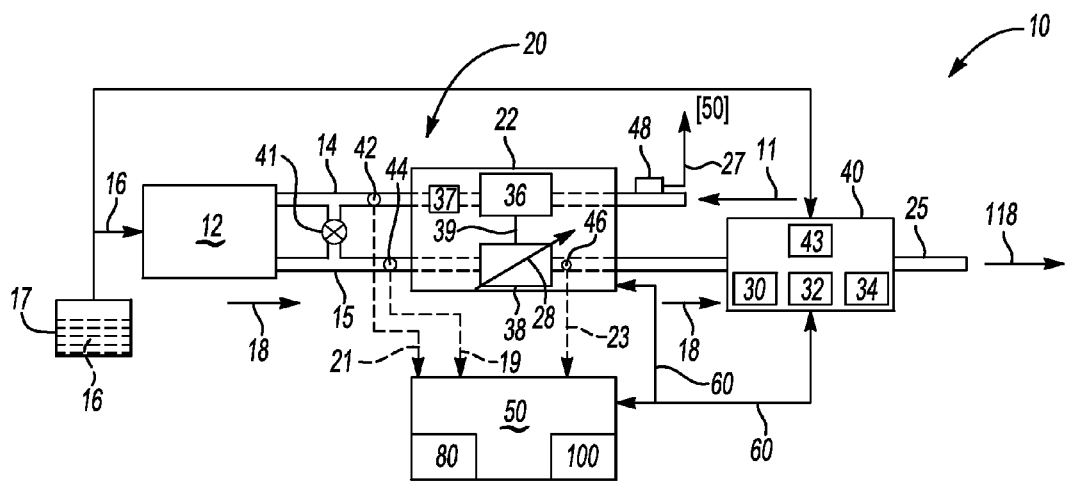
FIG. 1 is a schematic illustration of a vehicle having an internal combustion engine and a controller adapted for maintaining a desired turbine outlet temperature.

Referring to the drawings, wherein like reference numbers refer to like components, a vehicle 10 is shown in FIG. 1 having an engine control module or other suitable controller 50. The controller 50 maybe embodied as a host machine which executes an algorithm 100 programmed or recorded on a computer-readable medium in order to maintain a desired temperature within an exhaust system 20. Algorithm 100 is explained below with reference to FIG. 2.

Vehicle 10 includes an internal combustion engine 12. The engine 12 may be embodied as a multi-cylinder torque generating device which operates in a compression-ignition configuration, although other engine designs may also be used. Torque generated by engine 12 is transmitted to drive wheels through a transmission, with the drive wheels and transmission omitted from FIG. 1 for simplicity. Engine 12 draws diesel, gasoline, or other suitable fuel 16 from a fuel tank 17. A stream of exhaust gas 18 is generated as a byproduct of the combustion process occurring within the engine 12. The exhaust gas 18 passes through the exhaust system 20, where it is ultimately discharged as purified exhaust gas 118 into the surrounding atmosphere via a tail pipe 25.

The exhaust system 20 includes an air intake manifold 14, the exhaust manifold 15, an intake air compressor assembly 22, and an exhaust after-treatment system 40. Intake air, which is represented in FIG. 1 by arrow 11, is drawn into the engine 12 via the air intake assembly 22. The exhaust system 20 as a whole is monitored by controller 50, and is configured to cleanse or purify the exhaust gas 18 before it is ultimately discharged to atmosphere as purified exhaust gas 118.

To that end, after-treatment system 40 may include one or more of an oxidation catalyst 30, a particulate filter 32, and a selective catalytic reduction (SCR) device 34. System 40 further includes a set of fuel injectors 43 in fluid communication with the tank 17 to receive fuel 16, with the injectors providing post hydrocarbon injection (HCI) of the non-torque generating fuel into the exhaust gas 18 during regeneration of the filter. The order of the various devices within system 40 may vary from the order shown in FIG. 1 and described above.

Particulate filter 32 may be constructed of a suitable substrate constructed of ceramic, metal mesh, pelletized alumina, or any other temperature and application-suitable material(s). As understood in the art, an SCR device such as SCR device 34 converts nitrogen oxide (NOx) gasses into water and nitrogen using an active catalyst. The SCR device 34 may be configured as a ceramic brick or a honeycomb structure, a plate, or any other suitable catalyst design.

Still referring to FIG. 1, air intake compressor assembly 22 includes an air compressor 36, an aftercooler 37 for cooling the compressed air, and a turbine 38, e.g., a variable position turbocharger (VGT) device as noted above according to one possible embodiment. The controller 50 may selectively adjust an angular position of such a VGT, e.g., by adjusting the position of its vanes. Turbine 38 is driven by exhaust gas 18, and thus rotates a compressor input member 39 to thereby energize or drive the air compressor 36. The vehicle 10 may also include an exhaust gas recirculation or EGR valve 41, which likewise can be controlled as needed to selectively direct a portion of the exhaust gas 18 back into the intake manifold 14 as needed.

Physical sensors includes a mass flow sensor 42 positioned at the outlet side of air intake compressor assembly 22, and a pair of temperature sensors 44 and 46. Temperature sensor 44 is positioned to measure the temperature of the exhaust gas 18 as it enters the turbine 38. The temperature sensor 46 measures the temperature of the exhaust gas 18 as it exits the turbine 38. A bank of other sensors 48 are used to measure the manifold pressure, air temperature, and mass flow of intake air (arrow 11) as the intake air enters the air compressor 36. A sensed or modeled value for the temperature entering the turbine 38 may be used by the controller 50, e.g., for protecting the turbine. However, for the present control system, the inlet and outlet temperatures of the air intake compressor assembly form the boundary conditions as noted below.

Mass flow sensor 42 generates a mass flow rate signal 21, temperature sensor 44 generates a temperature signal 19, and temperature sensor 46 generates a signal 23. Signals 19, 21, and 23 are relayed to the controller 50 for use in regulating the actual turbine outlet temperature via a set of control and feedback signals 60. The controller 50 uses the signals 19, 21, and 23, as well as a set of signals 27 from the bank of sensors 48 as needed, in calculating an engine thermal efficiency value for engine 12. Controller 50 also uses the engine thermal efficiency value to execute one or more control actions, thereby maintaining the outlet temperature of turbine 38 above a calibrated threshold. The threshold should sufficiently exceed the calibrated light-off temperature noted above, which may be otherwise difficult to achieve with a modern lean-burn engine.

In one embodiment, the turbine 38 may be configured as a turbocharger device having multiple vanes, each with a variable geometry or turbine angle as indicated by arrow 28 in FIG. 1. Controller 50 can control the angle of the vanes using signals 60 to thereby direct exhaust gas 18 onto the blades of the turbine at a specific angle, e.g., by energizing an actuator which moves the vanes, as is well understood in the art. At low engine speeds, for example, the vanes may be at least partially closed to reduce lag. At higher engine speeds the vanes may be fully opened. The turbine 38 thus converts exhaust gas 18 into mechanical energy suitable for driving the air compressor 36, and helps to regulate the volume and rate of air (arrow 11) being compressed and fed into the engine 12.

Controller 50 may be configured as an engine control module or a host machine programmed with or having access to algorithm 100. The controller 50 may be configured as a digital computer acting as a vehicle controller, and/or as a proportional-integral-derivative (PID) controller device having a microprocessor or central processing unit (CPU), read-only memory (ROM), random access memory (RAM), electrically-erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. A standard PID controller can be used having gains determined as a function of exhaust flow and temperature, and/or speed and load, in order to control the desired temperature with the desired response time.

During regeneration of particulate filter 32, the temperature within the oxidation catalyst 30 is maintained by controller 50 above the calibrated light-off temperature. The controller 50 also maintains a desired temperature in the particulate filter 32. This is done in order to ensure the accuracy of open-loop fueling quantities provided during the post HCI process. Calibrated or desired temperatures and other values such as the lower heating value (LHV) of exhaust gas 18 may be stored for reference by controller 50 in a lookup table 80. Additionally, the conversion efficiency of the SCR device 34 is highly dependent on the temperature in the oxidation catalyst 30 and the SCR device. Execution of warm up and/or temperature maintenance modes to pre-heat SCR device 34 and/or the oxidation catalyst 30 may be required in order to attain the desired temperatures for regeneration of the particulate filter 32.

Desired temperatures in the oxidation catalyst 30 may be achieved by throttling intake air 11 and by additional early post injection of hydrocarbons into the exhaust gas 18. Due to part-to-part variation of certain engine components, namely the mass air flow sensor 42, it may be common to see a variation in a desired vs. an actual temperature. At partial load conditions, a drop off may occur below the light-off temperature which forces an interruption of late post injection or HCI process, thereby extending regeneration times and reducing overall fuel economy. The conversion of the SCR device 34 may be limited in such a situation.

Figure 2:
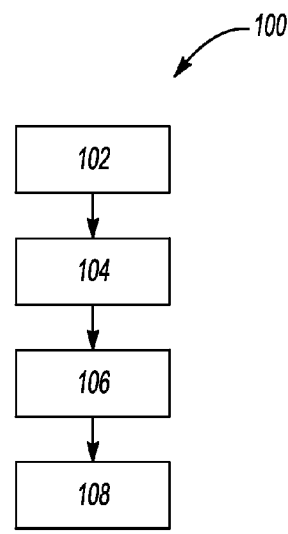
FIG. 2 is a flow chart describing a method for maintaining the desired turbine outlet temperature in the vehicle shown in FIG. 1.

Therefore, the controller 50 shown in FIG. 1 is adapted to execute algorithm 100 of FIG. 2 in order to provide a solution for a closed-loop system around the measurements of temperature sensor 46. The solution adjusts intake air flow into the engine 12, and/or adjusts the volume or rate of fuel used in the early post injection/HCI process in order to attain and maintain a desired turbine outlet temperature. In the event temperature sensor 46 is located a substantial distance away from the turbine outlet, information from lookup table 80 can be utilized to determine a desired temperature of the exhaust gas 18 exiting the turbine 38.

Referring to FIG. 2, algorithm 100 begins with step 102. Certain operating conditions may exist in lean-burn internal combustion engines, e.g., the engine 12 shown in FIG. 1, which may result in relatively low exhaust gas temperatures. This may cause some vehicles to operate continuously below the calibrated catalyst light-off temperature during certain vehicle drive cycles. The controller 50 solves this problem by executing algorithm 100, which ultimately results in adjustment by the controller of the air mass flow and/or early HCI rates or volumes. Algorithm 100 may be used to control exhaust temperatures at any point in the vehicle 10, e.g., at an inlet to the SCR device 34.

Beginning with step 102, the controller 50 calculates the thermal efficiency of the engine 12 as follows:

$$\eta th = 1 - \frac{(\dot{m}_{gas,out})(T_{gas,out})(cp_{gas,out})}{(\dot{m}_{gas,in})(T_{gas,in})(cp_{gas,in}) + (\dot{m}_{fuel})(LHV_{fuel})}$$

In this equation, $\dot{m}$ represents the mass flow rate of the fluid indicated in the subscript, e.g., of the exhaust gas 18, at the inlet ($\dot{m}_{gas,\,in}$) and outlet ($\dot{m}_{gas,\,out}$) of the air compressor 36 and turbine 38, respectively, or of the fuel 16 ($\dot{m}_{fuel}$). LHV is the lower heating value of the fuel 16 as noted above.

At step 104, with the calculated engine thermal efficiency value ($\eta th$) from step 102 describing the current operating point, controller 50 substitutes the value for $T_{gas,out}$, i.e., the turbine outlet temperature, with $T_{gas,out,des}$, i.e., a calibrated or desired outlet temperature from turbine 38. The controller 50 then solves for the intake air mass flow $\dot{m}_{gas,in}$, i.e., into the compressor 36, which now becomes the desired air mass flow. $\dot{m}_{gas,in,des}$, $\dot{m}_{gas,out,des}$ in order to achieve the desired temperature exiting the turbine 38.

That is:

$$\dot{m}_{gas,in,des} = \left[ \frac{\frac{(\dot{m}_{gas,out})(T_{gas,out,des})(cp_{gas,out})}{1-\eta th} - (\dot{m}_{fuel})(LHV_{fuel})}{(T_{gas,in})(cp_{gas,in})} \right]$$

The desired adjustment to air mass setpoint is then equal to: $\dot{m}_{gas,in} - \dot{m}_{gas,in,des}$. Such a setpoint is referred to herein as a required adjustment parameter.

At step 106, the controller 50 can also solve for $\dot{m}_{fuel,des}$ in exactly the same fashion to determine the amount of additional early post injection quantity to achieve the desired temperature.

$$\dot{m}_{fuel,des} = \left[ \frac{\frac{(\dot{m}_{gas,out})(T_{gas,out,des})(cp_{gas,out})}{1-\eta th} - (\dot{m}_{gas,in})(T_{gas,in})(cp_{gas,in})}{(LHV_{fuel})} \right]$$

At step 108, the controller 50 executes a suitable control action using the values calculated in the preceding steps. For example, controller 50 may adjust both the mass flow of the air (arrow 11) entering the air compressor 36 shown in FIG. 1, and the post injection quantity from the injectors 43 of the same figure, in order to achieve a desired temperature out of the turbine 38 without the use of calibration maps. The determination of which method and/or quantities can be decided beforehand during calibration. For instance, the adjustment to a post injection quantity of fuel 16 into the exhaust gas 18 may occur only after a maximum allowed adjustment to air quantity is first made, or a split may be made between the two.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an internal combustion engine;
an exhaust system having a set of fuel injectors adapted to inject fuel into a stream of exhaust gas from the engine, wherein the exhaust system is operable for selectively igniting the fuel after the fuel has been injected into the exhaust gas to thereby purify the exhaust gas;
an air compressor operable for compressing intake air, and for delivering the compressed intake air to the engine;
a turbine adapted for converting the exhaust gas from the engine into mechanical energy for powering the air compressor;
a first sensor adapted for measuring an inlet temperature of the intake air entering the air compressor;
a second sensor adapted for measuring an outlet temperature of the exhaust gas exiting the turbine;
a third sensor which measures a mass flow rate of the compressed intake air entering the engine; and
a controller operable for calculating an engine thermal efficiency value as a function of the inlet temperature, the outlet temperature, and the mass flow rate;
wherein the controller uses the engine thermal efficiency value to maintain a temperature of the exhaust gas downstream of the turbine above a calibrated threshold temperature.

2. The vehicle of claim 1, wherein the controller uses the engine thermal efficiency value to calculate at least one of a change in a rate of injection of the fuel into the exhaust gas by the fuel injectors, and a change in the mass flow rate of the compressed intake air entering the engine.

3. The vehicle of claim 2, wherein the controller uses the engine thermal efficiency value to calculate both of the change in a rate of injection of the fuel into the exhaust gas and the change in the mass flow rate of the compressed intake air.

4. The vehicle of claim 1, wherein the controller calculates the engine thermal efficiency value as a function of the lower heating value of the fuel.

5. The vehicle of claim 1, wherein the turbine is a variable geometry turbine (VGT), and wherein the controller maintains the temperature of the stream of exhaust gas in part by adjusting an angular setting of the VGT.

6. The vehicle of claim 1, wherein the calibrated threshold temperature exceeds a calibrated light-off temperature for igniting the fuel.

7. A control system for use aboard a vehicle having an internal combustion engine, the control system comprising:
a first temperature sensor adapted for measuring an inlet temperature of intake air entering an air compressor of the vehicle, wherein the air compressor is energized within an air compressor intake assembly by a turbine to thereby generate compressed intake air;

a second temperature sensor adapted for measuring an outlet temperature of exhaust gas exiting the turbine;

a mass flow sensor positioned to measure a mass flow rate of the compressed intake air entering the engine from the air compressor; and a host machine operable for calculating an engine thermal efficiency value as a function of the inlet temperature, the outlet temperature, and the mass flow rate;

wherein the host machine maintains a temperature of the exhaust gas exiting the turbine above a calibrated threshold temperature using the engine thermal efficiency value.

8. The control system of claim 7, wherein the host machine uses the engine thermal efficiency value to calculate at least one of a change in a rate of injection of the fuel into the exhaust gas by the fuel injectors and a change in the mass flow rate of the compressed intake air entering the engine from the air compressor.

9. The control system of claim 8, wherein the host machine uses the engine thermal efficiency value to calculate both the change in the rate of injection of the fuel and the change in the mass flow rate of the compressed intake air.

10. The control system of claim 7, wherein the host machine extracts a lower heating value (LHV) of the fuel from a lookup table, and then calculates the engine thermal efficiency value as a function of the LHV of the fuel.

11. The control system of claim 7, wherein the turbine is a variable geometry turbine (VGT), and wherein the host machine maintains a temperature of the exhaust gas in part by varying an angular setting of the VGT.

12. A method for maintaining a temperature of an exhaust gas in a vehicle having an engine, a turbine which energizes an air compressor, and an exhaust system having fuel injectors adapted to inject fuel into a stream of exhaust gas, wherein the exhaust system is operable for purifying the exhaust gas by selectively igniting the fuel in the exhaust gas, the method comprising:

measuring an inlet temperature of intake air entering the air compressor and an outlet temperature of the exhaust gas exiting the turbine;

measuring a mass flow rate of compressed intake air entering the engine from the air compressor;

using a host machine to calculate an engine thermal efficiency value as a function of the inlet temperature, the outlet temperature, and the mass flow rate of the compressed air; and using the engine thermal efficiency value to automatically maintain a temperature of the exhaust gas at the outlet of the turbine above a calibrated threshold temperature.

13. The method of claim 12, wherein using the engine thermal efficiency value to automatically maintain a temperature of the exhaust gas includes:

calculating a required change parameter, including at least one of a change in a rate of injection of the fuel into the exhaust gas by the fuel injectors and a change in the mass flow rate of the compressed air entering the engine; and executing a control action using the required change parameter to thereby affect the change indicated by the required change parameter.

14. The method of claim 13, wherein calculating a required change parameter includes calculating both of the change in a rate of injection of the fuel into the exhaust gas and the change in the mass flow rate of the compressed air entering the engine.

15. The method of claim 13, wherein the host machine calculates the engine thermal efficiency value as a function of the lower heating value of the fuel.

16. The method of claim 13, wherein the turbine is a variable geometry turbine, and wherein executing a control action includes varying an angular setting of the VGT.

* * * * *